Patented Dec. 5, 1944

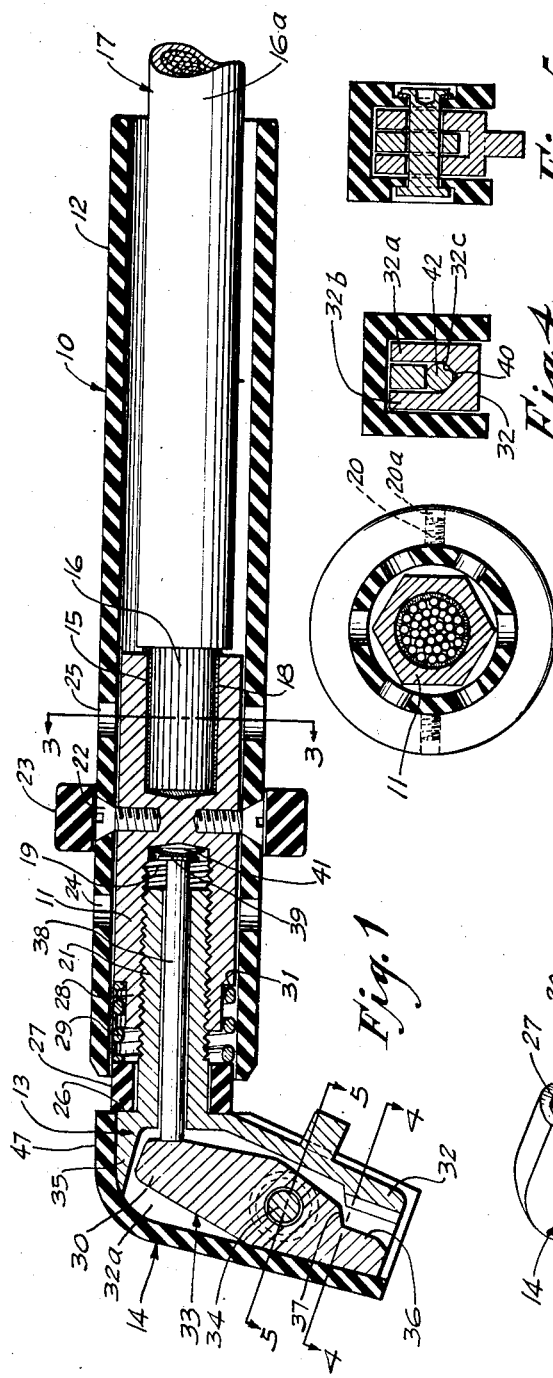

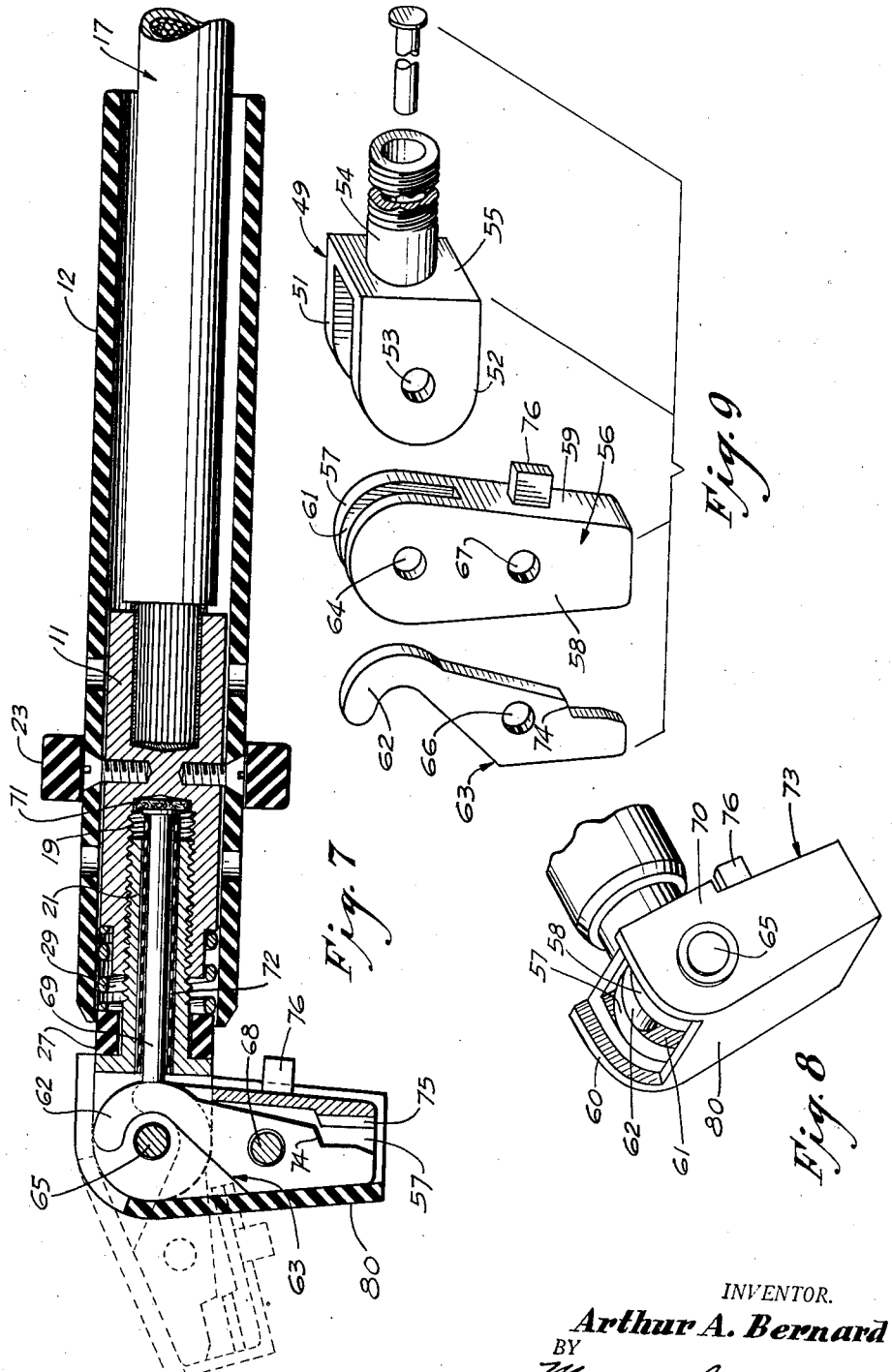

2,364,508

UNITED STATES PATENT OFFICE 2,364,508

WELDING ELECTRODE HOLDER

Arthur A. Bernard, Chicago, Ill.

Application December 2, 1943, Serial No. 512,568

17 Claims. (Cl. 219—8)

This invention relates to welding apparatus, and more particularly to holders for electrodes used in arc welding.

One of the principal objects of the invention is the provision of a holder that is capable of clamping an electrode used in arc welding in such manner that resistance heating does not develop even during extended periods of use.

Another object of the invention is the provision of a new and improved electrode holder that has novel means for frictionally holding the head and jaw portion in any adjusted angular position relative to the handle portion while loading and unloading the holder.

Another object of the invention is the provision of a new and improved electrode holder that has heads and jaws of minimum diameters, with the connecting elements of maximum cross-sectional areas.

A further object of the invention is the provision of gripping jaws and clamping mechanism of such nature that resistance heating of the rod will be reduced to such an extent as to be practically negligible, whereby the unused or stub portion of the rod will be reduced to a minimum.

Another object of the invention is the provision of a new and improved welding rod holder having tapered jaw members arranged at an angle to the handle, and having novel clamping means for firmly holding the rod and for eliminating resistance heating.

A still further object of the invention is the provision of a new and improved welding rod holder having jaw members that may be adjusted to different angles relative to the handle portion, and having mechanism for simultaneously clamping the rod and securing the jaws in adjusted position.

A further object of the invention is the provision of a welding rod holder that is simple in construction, effective in operation, that has simple means for operating the clamping mechanism, that does not develop objectionable resistance heating while in use, and one in which the rod is not likely to accidentally become loose while in use.

Other and further objects and advantages of the invention will appear from the following description, taken in connection with the accompanying drawings in which Fig. 1 is a longitudinal section of the electrode holder;

Fig. 2 is a perspective view of the same;

Figs. 3, 4 and 5 are sectional views on the lines 3—3, 4—4 and 5—5, respectively, of Fig. 1;

Fig. 6 is a perspective view of the insulating hood for the head of the electrode holder;

Fig. 7 is a longitudinal section similar to Fig. 1, showing a modified form of construction;

Fig. 8 is a perspective view of the head and a portion of the handle, with parts broken away;

Fig. 9 is an exploded view of the head; and

Fig. 10 is a cross-section similar to Fig. 4, but showing a modified form of gripping jaws.

In the construction and use of welding rod holders of certain of the conventional types, considerable difficulty has developed in that the connections of the various parts are not sufficient to prevent resistance heating, and as a result the jaws and upper ends of the rods become heated to such a temperature that the coatings on the rods are destroyed before the rod is anywhere near consumed, thus necessitating discarding the stub while it is still of considerable length.

Furthermore, in certain types the holder retains the rod in a position transverse to the holder, thus preventing the use of such a holder and rod in numerous conditions where the space is so restricted that the rod and holder cannot be introduced to do the welding therein.

The present invention seeks to remedy these objections by the provision of a holder that so firmly grips the welding rod that resistance heating is eliminated; that is so constructed, and holds the rod in such position, that it may be introduced in restricted spaces; that grips only a limited length of the end of the rod; and one that consumes a maximum length of the rod, leaving a stub of minimum length.

Referring now to the drawings, the deference character 10 designates, generally, the electrode holder which comprises a body portion 11, a handle portion 12, a head portion 13, and an insulating hood or shield portion 14 for insulating the head 13. The body portion 11 is provided with what for convenience of description will be termed its inner end, with an axial bore 15 for receiving the bared conducting wires 16 of a conductor cable 17. The conducting wires 16 are inclosed in an insulating sleeve 16ª, and the bared ends of the cable are rigidly connected to the body portion, as by being sweated in the bore 15 of the body portion 11 by the use of solder means 18, which rigidly holds the parts together and forms a conductor rigid with the wires. The outer end of the body portion 11 is provided with a screw-threaded axial opening 19, which is adapted to receive a threaded shank 21 of the head portion 13.

The handle portion 12 is hollow, and is of any suitable insulating material, such as Bakelite, or of any suitable artificial resin; and is adapted to slide over the entire body portion 11 and extend outwardly slightly beyond the same. The body portion 11 is hexagonal in cross-section, as shown in Fig. 3, and suitable screws 22, extending through the handle portion 12 into the body portion, hold the handle portion rigidly in position on said body portion. A ring or annular member 23, of insulating material, extends about the handle over the screws 22 for concealing the same and preventing the hand of the operator from coming in contact with the screws. It is held in position by short headless screws 20, which are shorter than the threaded bores 20ᵃ. The ring portion 23 also limits the outer movement of the operator's hand while the device is being used.

Suitable openings 24, 25, are placed at intervals around the handle for providing ventilation for cooling the handle portion with air circulating through said openings and along the spaces formed between the handle portion and the flat surfaces of the sides of the body portion. The head portion 13 is provided with an annular shoulder 26 extending about the shank 21, and an annular band member 27, of insulating material, is mounted on the reduced portion of the shank formed by the shoulder 26 and extends inwardly within the handle 12.

The outer end of the body portion 11 is reduced, as shown at 28, and a coil spring 29 surrounds this reduced portion and seats against a shoulder 31 formed by the reduced portion 28, at its inner end, and abuts against the annular band member 27 at its outer end. This insulating annular band member 27 is of insulating material, and not only protects the shank and head portion from being contacted by the hand of the operator, but also acts as a friction brake or friction mechanism for holding the head 13 in any angular position, 10, to which it may be adjusted in removing and inserting welding rods in the jaws, as will presently appear. The spring is under tension at all times, so that it tends to force the shank outwardly, and this causes the threads to bind with the threads of the opening or socket 19 for preventing undue looseness of the parts.

The head 13 is provided with a fixed jaw 32, which is U shape in cross-section, having the side walls 32ᵃ and 32ᵇ and a bottom wall or web 32ᶜ, as shown more clearly in Figs. 4 and 5 of the drawings. The bottom wall or web 32ᶜ of the fixed jaw 32 has a V-shaped recess 40 therein extending longitudinally thereof, which will assist in clamping rods of different diameters, as will presently appear, within predetermined limits. This bottom wall 40ᵃ of the fixed jaw 32ᵈ may be preferably, though not necessarily, V-shaped, as shown in Fig. 10, for receiving the rod 42ᵃ, if desired.

The fixed jaw 32 extends downwardly and outwardly at an angle to the axis of the handle, and tapers toward its lower end, as shown more clearly in Fig. 2 of the drawings. By tapering the jaw it may be more easily inserted in places that are almost inaccessible to the clamping jaws of the conventional electrode holders.

Pivotally mounted within the U-shaped fixed jaw member 32 is a pivoted or movable jaw member 33. The pivot 34 for the jaw member is between the ends of the jaw member 33 and is much closer to the lower end of the jaw than to the upper end, so as to materially increase the leverage in clamping the welding rod. The upper end 30 of the movable jaw member 33 is tapered on its outer and inner sides, so that in operative or inoperative position it will remain within the confines of the sides of the fixed jaw member.

The head member 13 has a connecting portion 35 between its sides 32ᵃ and 32ᵇ, which extends over the upper end of the jaw member 33, thus forming a hollow head for receiving the jaw. The lower end of the movable jaw member 33 tapers toward its lower end and is provided adjacent its lower end with a reduced portion 36, forming a stop or shoulder 37 a slight distance above the outer or lower end of the movable jaw member 33 for limiting the insertion of a welding rod between the jaws, as will presently appear.

Suitable means are provided for engaging the upper or inner end 30 of the movable jaw for operating the same for clamping a welding rod between the lower portions of the jaws. As shown, the shank member 21 is provided with a passage or axial opening within which is slidably mounted an operating or push pin 38. The pin 38 is provided on its inner end with a head 39, adapted to engage a curved spring member 41 seated in the bottom of the threaded opening 19 in the body portion. The curved member 41 is resilient. By employing resilient means at this point the interengaging threads on the shank 21 and body portion are held in tight engagement, even though the head be accidently turned or unscrewed slightly during the welding operation. This is considered an important feature of the invention. This resilient member may be omitted, but a slight unscrewing of the handle or head would cause a more or less loose connection, which would cause resistance heating at this point. The spring also functions to a large extent as a lock for preventing loosening of the head should it be accidently unscrewed slightly.

The pin 38 engages the upper end 30 of the movable jaw, and this pin is forced outwardly when the handle is turned in one direction for forcing the inner or upper end of the movable jaw outwardly, thus causing the lower or outer end to move to the right in Fig. 1.

The distance between the side walls 32ᵃ and 32ᵇ limits the diameter of the welding rod that can be employed with any particular head. This arrangement is of considerable importance, as it limits the welder to a rod not above a certain diameter with which he is expert, as otherwise the welder may be tempted to use rods of larger diameters and with which he is not experienced, thus resulting in defective welds. By providing the V-shaped recess 40 for receiving the rod 42, Fig. 4, and with the movable jaw engaging the rod opposite the V, there is provided a three-line engagement which firmly clamps the rod in the holder and at the same time makes a good electrical connection between the holder and rod. Heads having the side walls of the fixed jaw spaced farther apart are provided, as shown in Fig. 10, and are used interchangeably with the head 13. The V groove permits the use of rods of smaller diameter than the rod 42 in Fig. 4.

Suitable means are provided for insulating the head, and in the form of construction illustrated a hood or shield member 14, Fig. 6, of insulating material is employed for this purpose. This hood member is in the form of a channel having the sides 44 and 45, and an outer web portion 46 which is curved inwardly at its upper end, as shown at 47, Fig. 1, for extending over the upper web portion 35 of the head, as shown in Fig. 1. The web portion 46 is adapted to contact the ring 27 at its upper end, so as to make the insulation continuous from the handle to the lower end of the jaws of the holder. The pivot 34 extends through the side walls 44, 45, of the hood, and is provided with a head at each end for holding the parts in assembled relation and for holding the hood in position on the head.

The fixed jaw 32 is provided on what will be termed its under side with a projection 48, which is adapted to be employed for assisting in releasing or unscrewing the head when it is desired to remove the welding rod stub and insert a new welding rod. In making the change the operator holds the handle in one hand, and, with the new rod in the other, inserts the rod between the projection 48 and the band member 27, and uses the rod as a lever for holding the head while unscrewing it from the handle. When the movable jaw has been sufficiently released, the stub will drop out and then the new rod is inserted and the handle 12 is rotated for causing the jaws to grip the rod. When the jaws initially grip the rod it may then be used as a lever for holding the head while the handle is turned still further to properly grip the rod.

The form of construction shown in Figs. 7 to 9 differs from that described above in that the jaws are pivotally mounted on the head so that they may be made to take various angular positions relative to the handle. In this form of construction the mechanism for gripping the rod is also employed for holding the jaws at the selected or predetermined angle. The handle 12, conductor 17, body portion 11, insulating guard or ring member 23, annular or band member 27, and spring 29 are arranged substantially as described above.

In this form of construction the head member 49 is bifurcated at its outer end, providing the side walls 51, 52, and the connecting wall 55, Fig. 9. These side walls are provided with apertures 53 extending transversely therethrough. Extending rearwardly from the connecting wall 55 is a threaded shank member 54, which corresponds to the shank member 21 and is adapted to be threaded into the axial opening 19 of the body portion 11. The shank portion 54 of the head 49 is reduced so that the connecting wall 55 forms a shoulder against which the ring member 27 is adapted to engage, as in the previous construction. An adjustable jaw member 56, which is channel shaped, having the side walls 57 and 58, Figs. 7 and 9, connected together on their inner edges by a web portion 59, is provided. This web portion terminates short of the upper end of the jaw to form a slot 61 for receiving the upper end 62 of a movable jaw member 63. The upper ends of the walls 57 and 58 are provided with alined openings 64, which extend across the slot 61 and are in alinement with the openings 53 in the head 49 when the adjustable jaw is inserted between the walls 51, 52, of the head and the parts are assembled. A suitable pivot pin 65 extends through the alined openings 53 and 64.

A movable or pivoted jaw member 63 is provided for cooperating with the adjustable jaw member 56 for clamping a welding rod. This member is provided on its intermediate portion with an opening 66, which is adapted to aline with corresponding openings 67 in the side walls of the adjustable jaw 56, and a pivot 68, extending through the openings 66 and 67, pivotally connects the movable jaw to the adjustable jaw after the former has been inserted in the channel in the adjustable jaw, as shown more clearly in Fig. 7. The upper end 62 of the movable jaw is curved on a radius with the pivot pin 65 as a center, and it will be evident, when the parts are assembled, that the movable and adjustable jaws may be moved to the dotted line position shown in Fig. 7, or to any desired angular position between that shown in full and dotted lines in Fig. 7. In practice, the adjustable jaw 56 is adjustable between an angle of, say, approximately 75° and 160° to the handle portion.

The means for operating the movable jaw is also employed for holding the adjustable jaw in fixed position. This means comprises a pin 69, which is similar to the pin 38 already described, but in this instance means are provided for insulating the pin. As shown, a resilient insulating member 71 is inserted between the head of the pin and the bottom wall of the threaded opening 19, and an insulating sleeve 72 extends about the pin for insulating the same. It will be noted that the axis of the pin 69 extends transversely across the center line of the pin 65, so that when the pin is forced outwardly against the curved projection 62 there will be no tendency to cause the adjustable jaw to move in either direction, in any position in which the head may be adjusted.

A shield or hood 73, of insulating material, in channel form, extending over the outer portions of the jaws and having its side walls 60 and 70 attached to the pivot 65, is employed for insulating the jaws. The upper portion of the web 80 of this hood or shield is removed to provide clearance for the angular movement of the adjustable jaw, as shown in Figs. 7 and 8.

The movable jaw 63 is provided with a shoulder or stop 74 for limiting the insertion of the rod between the jaws, as in the previous construction. The adjustable jaw is provided with an angular groove 75, which is preferably V-shaped as in the construction described above. A projection or lug 76 is provided on the adjustable jaw so that a welding rod may be inserted between it and the insulating ring 27 for releasing the head, as in the construction described above.

In removing a stub and inserting a new rod, the rod is inserted between the lug or projection and the ring or band 27, as in the previous construction, and the handle is then rotated for releasing the stub. After the stub is released the new rod is inserted between the jaws until it comes in contact with the stop 74, after which the jaws are moved to the desired angular position relative to the handle, and then the handle is turned for clamping the rod. In clamping the welding rod in position the pressure on the curved end 62 of the movable jaw 63 by the pin 69 will force the jaw 63, and with it the adjustable jaw 56, outwardly against the pivot 65, thereby binding the parts and holding the jaws in adjusted position.

Instead of providing an insulated hood or shield for the head and jaws of either form of construction disclosed, the head and jaws may be enameled for insulating the same. By enameling the outer surface of the head and jaws their overall dimensions will be much smaller than when hoods or shields of insulation are employed.

In both forms of construction the movable or pivoted jaw member is pivoted between its ends, and the force for operating the movable jaw is applied at its inner or upper end, as viewed in Figs. 1 and 7, and its outer or lower end engages the welding rod 42, Fig. 4. The leverage is, therefore, of the first class, and since the pivot is much closer to the gripping end of the movable jaw a very great force may be exerted to grip the welding rod. As shown, the leverage is about 1½ to 1, but this may be varied as may be desired. Furthermore, what may be termed the clamping action is further magnified by reason of the threaded connection of the handle and head operating on the screw principle to tremendously increase the rod gripping force of the jaws, and as a result the rod is clamped sufficiently tight to make an excellent conductor connection between the conductor cable and rod. With such connection it is found by actual use that resistance heating is reduced to a minimum, and that the head and jaws of the holder are cool enough to hold in the hand even after prolonged use in welding.

It is sometimes desirable to provide interchangeable heads, as where welders are paid by the piece for welding with, say, ¼" welding rods, and are experts in welding with that size rods but may be tempted to use larger diameter rods for more rapid welding, though may not be experts with rods of that larger size, hence resulting in inferior welds. A plurality of heads of different capacities may be used with the same head. It often happens that a seam to be welded has different welding conditions throughout its length. For instance, one end of the weld may require rods of larger diameter than the remaining portion. If the head in use will not receive the larger rod then the head may be changed. Again, the welder may prefer a head having the jaws at a particular angle, and a part of the seam may be so inaccessible that the welder's preferred angle could not be used, but a holder having a different angle must be used. The welder may make the interchange for that portion of the weld and yet both heads cooperate to produce a single result, viz: a single length of welded seam.

The combination shown in Fig. 10 is similar to that shown in Fig. 4, except that the side walls 32ᵈ and 32ᵉ of the fixed jaw 32ᶜ are further apart for accommodating rods 42ᵃ of greater diameter. The movable jaw 33ᵃ is correspondingly increased in width, and the exterior surfaces of the jaws and head are enameled, as shown at 50.

This is a continuation in part of my previously filed application Ser. No. 481,661, filed April 3, 1943, for Electrode holder for welding apparatus.

It is thought from the foregoing, taken in connection with the accompanying drawings, that the construction and operation of my device will be apparent to those skilled in the art, and that changes in size, shape, proportion or detail may be made without departing from the spirit and scope of the appended claims.

I claim as my invention:

1. In an electrode holder, a body portion, means for connecting a conductor to said body portion, a head comprising an inner portion aligned with the body portion and having a first jaw extending at an inclination therefrom, a second jaw pivoted between its ends to the first jaw for cooperating therewith to hold an electrode, means for rigidly connecting the head to the body portion, and rigid means engaging the inner end of the second jaw to move the same about said pivot for causing said jaws to grip an electrode.

2. In an electrode holder, a body portion, means for connecting a conductor to said body portion, a head comprising an inner portion aligned with the body portion and having a first jaw extending at an inclination therefrom, a second jaw having a pivot between its ends connecting said jaw to the first jaw for cooperating therewith to hold an electrode, means for rigidly connecting the head to the body portion, and rigid means engaging the inner end of the second jaw to move the same about said pivot for causing said jaws to grip an electrode.

3. In an electrode holder, a body portion, means for connecting a conductor to said body portion, a head comprising an inner portion aligned with the body portion and having a hollow outer portion extending at an inclination therefrom, said outer portion terminating outwardly in a first jaw, a second jaw pivoted between its ends to the first jaw for cooperating therewith to hold an electrode and having an inner end extending into the hollow outer portion of the head, means for rigidly connecting the head to the body portion, and rigid means engaging the inner end of the second jaw to move the same about said pivot for causing said jaws to grip an electrode.

4. In an electrode holder, a body portion, means for connecting a conductor to said body portion, a head comprising an inner portion aligned with the body portion and having a first jaw extending at an inclination therefrom, the inner portion of said first jaw being hollow, a second jaw pivoted between its ends to the first jaw for cooperating therewith to hold an electrode and having its inner end disposed within the hollow of the first jaw, means for rigidly connecting the head to the body portion, and rigid means engaging the inner end of the second jaw to move the same about said pivot for causing said jaws to grip an electrode.

5. In an electrode holder, a body portion, means for connecting a conductor to said body portion, a head comprising an inner portion aligned with the body portion and having at its outer end a generally channel-shaped first jaw, said jaw having a flaring hollow chamber adjacent to its connection with the inner portion of the head, a second jaw pivoted between its ends to the first jaw for cooperating therewith to hold an electrode and having its inner end disposed within said chamber and adapted to rock therein to move its outer end toward the outer end of the first jaw to cooperate therewith in clamping an electrode, means for rigidly connecting the head to the body portion, and rigid means engaging the inner end of the second jaw to rock the same about said pivot.

6. In an electrode holder, a body portion, means for connecting a conductor to said body portion, a head comprising an inner portion aligned with the body portion and having a first jaw extending at an inclination therefrom, a second jaw pivoted between its ends to the first jaw for cooperating therewith to hold an electrode, means for rigidly connecting the head to the body portion, and rigid means engaging the inner end of the second jaw to move the same about said pivot for causing said jaws to grip an electrode, at least one of said jaws being longitudinally grooved to conform substantially to the electrode surface and being provided with a shoulder for limiting insertion of the electrode.

7. In an electrode holder, a body portion, means for connecting a conductor to said body portion, a head comprising an inner portion aligned with the body portion and having a first jaw extending at an inclination therefrom, a second jaw pivoted between its ends to the first jaw for cooperating therewith to hold an electrode, means for rigidly connecting the head to the body portion, rigid means engaging the inner end of the second jaw to move the same about said pivot for causing said jaws to grip an electrode, said jaws being longitudinally grooved so as to cooperate to provide a cavity having substantially the shape of the butt end of an electrode, and a shoulder formed at the inner end of said cavity for limiting insertion of the electrode.

8. In an electrode holder, a body portion, means for connecting a conductor to said body portion, a head comprising an inner portion aligned with the body portion and having a first jaw extending at an inclination therefrom, a second jaw pivoted between its ends to the first jaw for cooperating therewith to hold an electrode, means for rigidly connecting the head to the body portion, a shield of insulating material over said head, and rigid means engaging the inner end of the second jaw to move the same about said pivot for causing said jaws to grip an electrode, at least one of said jaws being longitudinally grooved for receiving an electrode and for limiting to a predetermined maximum the diameter of the electrode receivable by said jaws.

9. In an electrode holder, a body portion of conducting material, a handle portion of insulating material secured over said body portion, a conductor extending through said handle portion and rigidly connected to said body portion, a head of conducting material detachably connected to said body portion, a pair of jaw members of conducting material pivotally connected together and to said head, and means for simultaneously adjusting said jaws for clamping a welding rod and for holding said jaws in angular adjustment on said head.

10. In a welding rod holder, a body portion having a threaded opening in its outer end, means for securing a conductor to said body portion, a head having a fixed jaw and a movable jaw pivoted between its ends to the fixed jaw, said head having a threaded shank member engaging the threaded opening in said body portion, a pin slidably mounted in an opening in said shank member and engaging said body portion at one end and one end of said movable jaw at the other for forcing the outer end of said movable jaw toward the outer end of said fixed jaw for gripping a welding rod between said jaws.

11. In a welding rod holder, a body portion, a handle therefore, a conductor secured to the inner end of said body portion, said body portion having a threaded opening in the outer end of said body portion, a head having a shank threaded in said opening, a pair of jaws carried by said head, one of said jaws being movable relative to the other, a push rod extending through a bore in said shank and engaging the movable jaw for forcing it into clamping relation relative to the other jaw, and resilient means between the inner end of said pin and said body portion for tending to force said shank outwardly for binding said threads when said body portion is secured onto said shank portion.

12. In a welding rod holder comprising a body portion, a conductor secured to one end of said body portion, a handle of insulating material extending over said body portion, said body portion having a threaded passage extending lengthwise thereof, a head member having a threaded shank engaging in said passage, a movable jaw pivotally connected to said head, a pivoted jaw pivotally connected to said movable jaw and having its inner end curved about the pivot of the movable jaw, a pin extending along a passage of said shank and engaging said curved end for holding said movable jaw in adjusted position and holding said fixed jaw in position for clamping a welding rod against said movable jaw.

13. In a welding rod holder, a body portion angular in cross-section and having a conductor secured thereto and having a threaded opening in its outer end, a handle of insulating material surrounding said body portion, screws for securing said handle to said body portion, an annular guard of insulating material surrounding said body portion and concealing the outer ends of said screws, said handle having openings extending around the handle and communicating with the spaces between the sides of said body portion and said handle, a head having a jaw and provided with a threaded shank for engaging said threaded opening, a pivoted jaw mounted on said first-named jaw, a pin slidable along said shank and engaging the pivoted jaw for operating the same, resilient means between said pin and body portion for causing said movable jaw to yieldably clamp a welding rod against said first-named jaw, and resilient means between said head and body portion for yieldably holding said head in adjusted position on said body portion.

14. In a welding rod holder, a head having a threaded shank extending inwardly and having a jaw extending downwardly and outwardly and tapered toward its outer end, said jaw having a downwardly extending lug on its under side, said jaw being of channel form opening upwardly, and a second jaw pivoted between its ends to said first-named jaw, said shank having a passage for slidably receiving a pin for engaging the upper end of said second-named jaw for causing the same to clamp a welding rod against said first-named jaw.

15. In a welding rod holder, a head, a jaw carried thereby and having a V-shaped groove therein, a second jaw pivoted to the first-named jaw, means including a threaded shank, a pin slidably mounted in a passage in said shank and engaging the upper end of said second jaw, and a handle and body portion threaded on said shank for forcing said pin outwardly for causing said jaws to clamp a welding rod.

16. In a welding rod holder, a body portion having a threaded opening in its outer end, a conductor secured to the inner end of said body portion, a handle member surrounding said body portion, a head having a threaded shank engaging said opening, a jaw connected to said head, a second jaw pivoted to the first-named jaw, said shank having a passage extending longitudinally thereof, a pin slidable along said passage and engaging the upper end of said second jaw for clamping a welding rod between the lower ends of said jaws, means for limiting the insertion of said rod between said jaws, a hood of insulating material over said head and jaws, a collar of insulating material between said hood and handle member, resilient means extending around a reduced portion on said body portion and abutting a shoulder on said body portion and engaging a shoulder on said head for forcing said head outwardly and causing a binding action on the threads on said shank for holding said head in various angular positions on said body portion during the removal and insertion of welding rods, and a lug on the under side of said first-named jaw for holding said head from turning while releasing a stub upon inserting a welding rod between said lug and said insulating collar.

17. In an electrode holder, a body portion, means for connecting a conductor to said body portion, a head comprising an inner portion aligned with the body portion and having a first jaw extending at an inclination therefrom, a second jaw cooperating with the first jaw to hold an electrode and pivoted between its ends to the first jaw, said pivot being positioned nearer to the outer end of the second jaw than to the inner end, means for rigidly connecting the head to the body portion, and rigid means engaging the inner end of the second jaw to move the same about said pivot for causing the jaws to grip an electrode.

ARTHUR A. BERNARD.